(12) United States Patent
Shiga

(10) Patent No.: US 7,407,125 B2
(45) Date of Patent: Aug. 5, 2008

(54) RECORDING TAPE CARTRIDGE AND DRIVING DEVICE

(75) Inventor: Hideaki Shiga, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 30 days.

(21) Appl. No.: 11/545,532

(22) Filed: Oct. 11, 2006

(65) Prior Publication Data

US 2007/0080254 A1    Apr. 12, 2007

(30) Foreign Application Priority Data

Oct. 11, 2005    (JP) .............................. 2005-296793

(51) Int. Cl.
  G03B 23/02    (2006.01)
  B65H 75/08    (2006.01)
(52) U.S. Cl. .................... 242/332.4; 242/613
(58) Field of Classification Search ............. 242/332.4, 242/348, 532.6, 612, 613, 613.1, 613.2; 360/132
See application file for complete search history.

(56) References Cited

U.S. PATENT DOCUMENTS 2,772,774 A * 12/1956 Rabuse
3,066,794 A * 12/1962 Mulheren et al.
6,508,750 B1   1/2003 Poorman
2003/0197082 A1* 10/2003 Ojima
2004/0170717 A1    9/2004 Satoh et al.

FOREIGN PATENT DOCUMENTS

| EP | 1115115 | 7/2001 |
| JP | 58-212571 | * 12/1983 |
| JP | 60005484 | 1/1985 |
| JP | 60202588 | 10/1985 |
| JP | 61-54086 | * 3/1986 |
| JP | 61054086 | 3/1986 |
| JP | 06309837 | 11/1994 |
| JP | 07312061 | 11/1995 |
| JP | 08315540 | 11/1996 |
| JP | 09161441 | 6/1997 |
| JP | 9-511352 A | 11/1997 |
| JP | 2004-362755 A | 12/2004 |

* cited by examiner

Primary Examiner—William A Rivera
(74) Attorney, Agent, or Firm—Sughrue Mion, PLLC

(57) ABSTRACT

In a recording tape cartridge provided with a reel having a hub at which a recording tape is wound, a case that accommodates the reel such that the reel is rotatable, and an opening formed at the case from which a leader member attached to a distal end of the recording tape is pulled out, the hub is formed in a substantial barrel shape. Further, the hub of a take-up reel of a drive device into which the recording tape cartridge is loaded is formed in a substantial barrel shape.

19 Claims, 11 Drawing Sheets

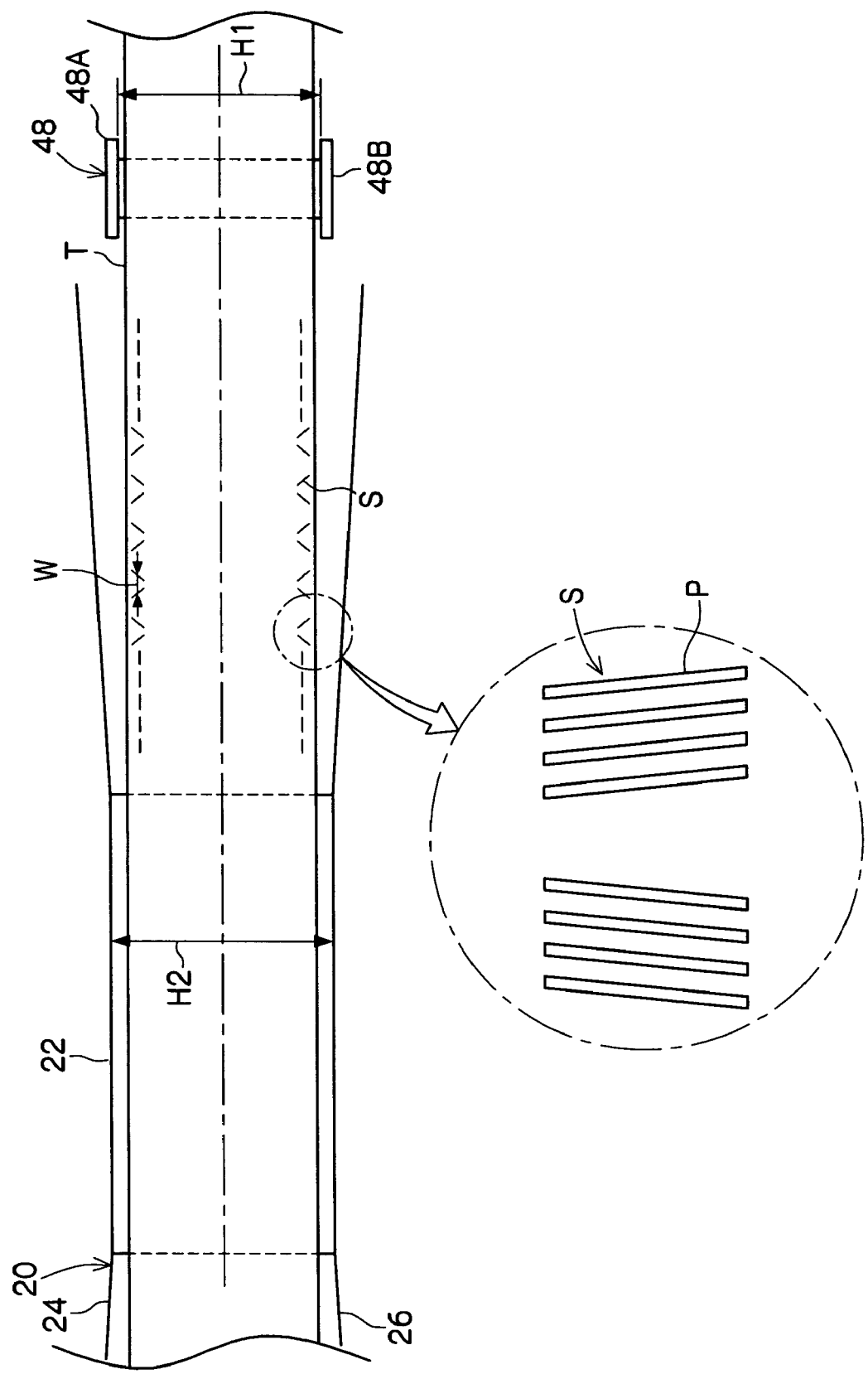

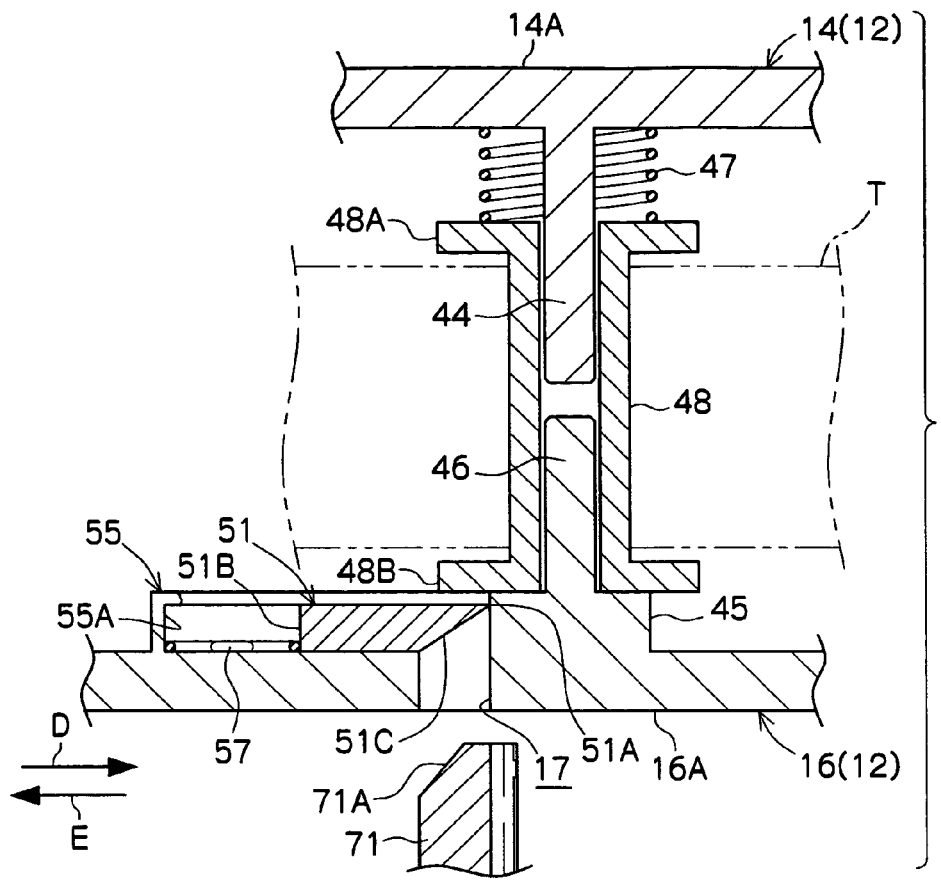
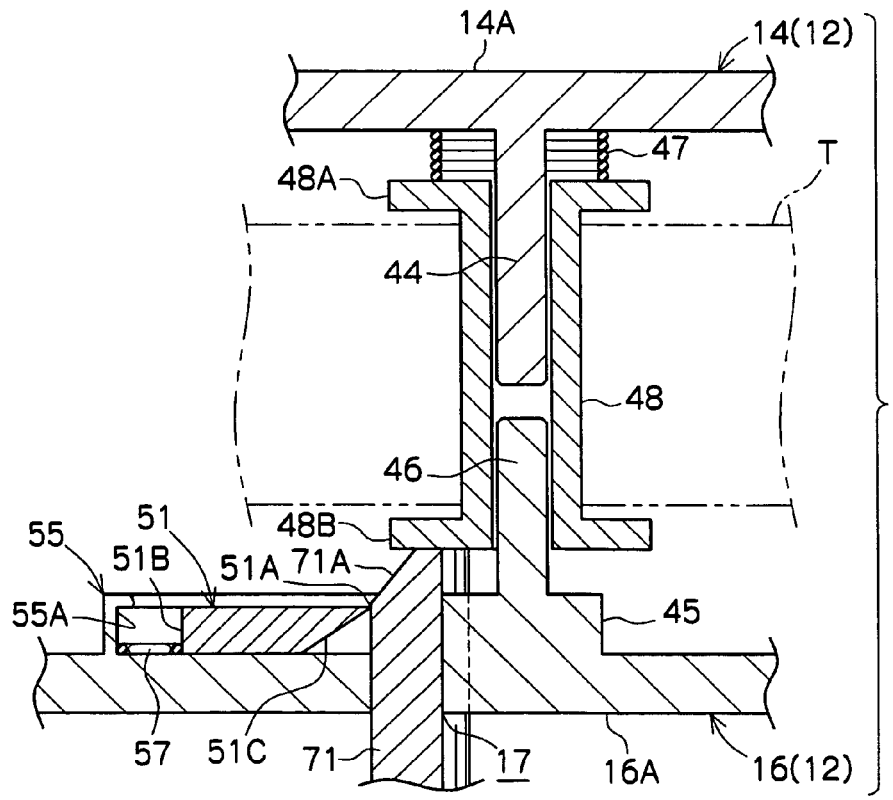

RECORDING TAPE CARTRIDGE AND DRIVING DEVICE

CROSS-REFERENCE TO RELATED APPLICATION

This application claims priority under 35 USC 119 from Japanese Patent Application No. 2005-296793, the disclosure of which is incorporated by reference herein.

BACKGROUND

1. Technical Field

The present invention relates to a recording tape cartridge that accommodates inside a case a recording tape, such as a magnetic tape, mainly used as a recording and playback medium in computers or the like, and to a drive device into which the recording tape cartridge is loaded.

2. Related Art

Recording tape cartridges in which a recording tape, such as a magnetic tape or the like, is wound on a reel (reel hub) and the single reel is accommodated within a case are conventionally known. The recording tape cartridge is used as a data recording/playback medium of computers or the like. When the recording tape cartridge is loaded into a drive device, the recording tape is pulled-out from an opening via a leader member. The recording tape which is pulled-out is taken-up onto a take-up reel which is disposed at the opposite side of the recording tape cartridge, with tape guides and a recording/playback head of the drive device therebetween.

Recording/playback systems (drive devices), which use recent recording tape cartridges which have improved recording density, are mainly of a type in which, on the basis of servo signals which are recorded in advance on the recording tape, the recording/playback head is moved in the vertical direction by an actuator with making the recording/playback head follows the servo signals, and data signals are recorded. Accordingly, it is desirable that the recording tape, which has been pulled-out from the recording tape cartridge, is supported by a plurality of tape guides within the drive device, and that control is carried out so that the recording tape always travels past a predetermined position of the recording/playback head.

Examples of tape guiding systems within a drive device are: a system in which a cylindrical-shaped member rotates and regulating portions (flanges) are formed at both ends of the member, a system in which a similar cylindrical-tube-shaped member or a block-shaped member is disposed so as to be fixed disclosed in Japanese Patent Application Laid-Open (JP-A) No. 2004-362755; a system in which a block-shaped member, which jets-out air and actively causes the recording tape to rise up, is disposed so as to be fixed disclosed in Japanese National Publication No. 9-511352, and the like.

It is difficult to provide the reel within the recording tape cartridge and the reel hub of the take-up reel within the drive device to be straight absolutely. It is also difficult to straightly assemble and operate the tape guides and motors which rotate the respective reels. Therefore, even if the recording tape is supported by the tape guides of the drive device, the recording tape fluctuates in the transverse direction (the vertical direction) while traveling.

In cases in which these fluctuations are marked, and, in particular, in cases in which the recording tape fluctuates in a short time period (large acceleration), it may be difficult for the recording/playback head, which moves in the vertical direction on the basis of the servo signals on the recording tape, to record or play-back the data signals because of these sudden positional fluctuations of the recording tape.

Further, in recent recording/playback systems having high recording density, the size of the servo signals is made to be small, the recording density of the servo signals themselves is increased, and the traveling speed of the recording tape is made to be faster. Therefore, recording/playback errors of the data signals arising due to reading errors of the servo signals may happen because of the recording tape fluctuation of a level which has not been problematic conventionally.

There are various factors causing fluctuations of the recording tape, such as bending of the recording tape, dispersion in the thickness distribution, residual warping, curling, an irregular curl in the transverse direction (heightwise direction) at the time when the recording tape is taken-up, the degrees of straightness of the take-up reel and the reel of the tape cartridge, the degrees of straightness of the motor, the tape guides, and the recording/playback head of the drive device, tape tension, positional offset in the transverse direction (vertical direction) of the plural tape guides, sliding resistance between the recording tape and contacting members, and the like.

If the traveling position of the recording tape becomes unstable for any reason, this becomes a cause of the winding position of the recording tape being in disorder when the recording tape is taken-up onto the reel or the take-up reel, and, when the recording tape is next fed-out in the opposite direction, fluctuations in the position of the recording tape arising, or the recording tape colliding with the regulating portions (flanges) of the cylindrical-tube-shaped tape guides such that the transverse direction end portions (edges) thereof become damaged.

Moreover, low-cost members are required in recording tape cartridges which are mass produced and consumed, as compared with the number of drive devices. Therefore, it is difficult to supply a recording tape cartridge which is adjusted at the time of assembly such that the precision thereof is improved. Further, as compared with the tape guides of the drive device, the dimensions of the reel hub of the tape cartridge are relatively large. Therefore, it is also difficult to obtain a reel hub having a cylindrical-tube shape which is as highly accurate as the tape guides of the drive device.

Further, when the recording tape is wound so as to be off-center with respect to the center position in a transverse direction (height direction) of the reel hub and skewed toward one or other of the upper and lower flanges, the state of winding (wound surface which faces the flange) of the recording tape is in good order (is flat) (referred to below as "order winding"). However, with this kind of winding, there have been cases where a phenomenon (referred to below as a "one wind flying phenomenon") has occurred where one wind of the recording tape flies out in a transverse direction from the orderly wound surface at an end portion in a transverse direction.

When the one wind flying phenomenon occurs, the end portion in a transverse direction of the one wind that has flown out can become kinked through contact with the upper flange or the lower flange when the recording tape cartridge is impacted during transportation or when dropped, for example, and when the recording tape is run inside the drive device, there have been problems such as reading errors of servo signals occurring or it becoming impossible to record or playback information.

In contrast, when the recording tape is wound at the substantial center in a transverse direction of the reel hub, the wound surface is not ordered and becomes a moderately and continuously convex and concave shaped (irregular-shaped)

wound surface (referred to below as "coarse winding"). Hitherto, coarse winding has been avoided due to instability in a transverse direction (vertical movement) when the recording tape is traveling and the unfavorable external appearance of the shape; however, it has been understood that the amount of flying out of one wind (the difference in the amount of flying out of adjacent winds of the recording tape) at coarse winding is less than the amount of flying out in the case of the one wind flying phenomenon that occurs with order winding.

In other words, it has been understood that with coarse winding, it is more difficult for the transverse direction end portions of the recording tape to be damaged when an impact is received during transportation or when dropped, for example, and even damage received is minimal. Further, while depending on the extent of the coarse winding, it has become clear that vertical movement of the recording tape when traveling can be maintained within an allowable range. Accordingly, it is preferable for winding to be conducted such that the transverse direction center position of the recording tape comes to the substantial transverse direction (height direction) center position of the reel hub.

SUMMARY

The present invention provides a recording tape cartridge that achieves improvement of impact resistance by enabling a recording tape to be wound at the substantial center of a hub and that enables reduction of the occurrence of reading errors of servo signals and recording/playback errors of data signal when the tape is running inside a drive device, and the drive device.

A recording tape cartridge according to a first aspect of the present invention includes a reel having a recording tape wound at a hub, a case accommodating the reel such that the reel is rotatable, and an opening formed at the case from which a leader member attached to a distal end of the recording tape is pulled out, wherein the hub is formed in a substantial barrel shape.

According to the invention of the first aspect, it is possible to consistently wind the recording tape at the substantial center in a transverse direction (height direction) of the hub. Accordingly, the one wind flying out phenomenon of the recording tape can be prevented and it is possible to reduce damage to the recording tape during transportation or when dropped, for example (it is possible to improve impact resistance). Further, as a result, the occurrence of reading errors of servo signals or recording/playback errors of data signals when the recording tape is running inside a drive device can be reduced.

Further, in a recording tape cartridge according to a second aspect, the difference between the maximum radius and the minimum radius of the hub of the recording tape cartridge of the first aspect is from 0.03 mm to 0.30 mm.

In a recording tape cartridge according to a third aspect, the difference between the maximum radius and the minimum radius of the hub of the recording tape cartridge of the first aspect is from 0.2% to 2.5% with respect to a transverse dimension of the recording tape.

Further, in a recording tape cartridge according to a fourth aspect, the maximum radius of the hub of the recording tape cartridge of any of the first to third aspects is at the substantial center in a transverse direction of the hub.

In addition, in a recording tape cartridge according to a fifth aspect, when the recording tape cartridge of the fifth aspect is loaded into a drive device, a center position in a transverse direction of the recording tape when traveling is substantially aligned with (is substantially the same as) a center position in a transverse direction of the hub.

According to the inventions according to the second to fifth aspects, winding the recording tape at the substantial transverse direction center of the hub can be favorably achieved.

Further, in a recording tape cartridge according to a sixth aspect, a tape guide is provided inside the case of the recording tape cartridge of the fifth aspect such that the recording tape slidably contacts the tape guide at least while the leader member is being pulled out from the opening.

In a recording tape cartridge according to a seventh aspect, the tape guide of the recording tape cartridge of the sixth aspect has a substantially cylindrical shape with flanges formed at distal ends in a transverse direction and is structured so as to be rotatable in conjunction with the recording tape slidably contacting the tapeguide.

According to the inventions of the sixth and seventh aspects, after the transverse direction (vertical direction) position of the recording tape pulled out from inside the case is regulated by the tape guide provided inside the case, it is supported by tape guides of the drive device. Further, the transverse direction (vertical direction) position of the recording tape is also regulated by the tape guide provided inside the case while the recording tape is wound back onto the reel. Accordingly, vertical fluctuation of the recording tape can be mitigated and sudden vertical fluctuation of the recording tape can be suppressed.

Further, in a recording tape cartridge according to an eighth aspect, a position adjustment unit is provided that enables the tape guide of the recording tape cartridge of the sixth or seventh aspects to move in conjunction with the reel to the same height when the recording tape cartridge is loaded into the drive device In a recording tape cartridge according to a ninth aspect, the position adjustment unit includes: an urging unit that urges the tape guide toward a floor plate (a bottom plate) of the case; and a hole that in plan view overlaps the flange which is formed at a transverse direction end of the tape guide, and is provided at the floor plate of the case, the position adjustment unit is configured such that when the recording tape cartridge is loaded into the drive device, an engaging member provided at the drive device enters in from the hole and causes the tape guide to move toward a ceiling plate (a top plate) of the case against the urging force of the urging unit via the flange.

According to the inventions of the eighth and ninth aspects, the tape guide provided inside the case is always positioned at the same height as the reel even when the recording tape cartridge is loaded into the drive device. Accordingly, there is no occurrence of defects such as kinks in the recording tape between the reel and the tape guide damaging the recording tape. Further, simply by providing the engaging member at the drive device side, there is the advantage that the invention can be achieved at low cost since a complex mechanism for position adjustment is unnecessary.

Further, in a recording tape cartridge according to a tenth aspect, a cover is provided that can close the hole when the recording tape cartridge of the ninth aspect is not loaded into the drive device.

According to the invention of the tenth aspect, dust or the like can be prevented from entering via the hole when the recording tape cartridge is not loaded into the drive device and is not in use (for example, during storage or transportation).

Further, in a recording tape cartridge according to an eleventh aspect, the tape guide of the recording tape cartridge of any one of the sixth to tenth aspects is formed in a substantial barrel shape.

According to the invention of the eleventh aspect, the recording tape travels while having its position regulated at the substantial center in a transverse direction of the tape guide. Accordingly, sudden vertical fluctuations of the recording tape can be further suppressed.

Further, a drive device according to a twelfth aspect of the present invention includes a take-up reel that winds up a recording tape pulled out from a recording tape cartridge loaded into the drive device, wherein a hub of the take-up reel is formed in a substantial barrel shape.

According to the invention of the twelfth aspect, the recording tape can always be wound at a substantial center in a transverse direction (heightwise direction) of the hub. Accordingly, the one wind flying out phenomenon of the recording tape can also be prevented in the drive device, and damage to the recording tape can be reduced (impact resistance can be improved). Further, as a result, vertical fluctuations of the recording tape can be mitigated and sudden vertical fluctuations of the recording tape can be suppressed. As a result, the traveling position of the recording tape can be made more stable than conventionally, and the occurrence of reading errors of servo signals or recording playback errors of data signals in the drive device can be reduced even in the case of a recording tape having improved recording density.

Further, in a drive device according to a thirteenth aspect, the difference between the maximum radius and the minimum radius of the hub of the drive device of the twelfth aspect is from 0.03 mm to 0.30 mm.

In a drive device according to a fourteenth aspect, the difference between the maximum radius and the minimum radius of the hub of the drive device of the thirteenth aspect is from 0.2% to 2.5% with respect to a transverse dimension of the recording tape.

Further, in a drive device according to a fifteenth aspect, the maximum radius of the hub of the drive device of any one of the twelfth to fourteenth aspects is at the substantial center in a transverse direction of the hub.

In addition, in a drive device according to a sixteenth aspect, a center position in a transverse direction of the recording tape is substantially aligned with (is substantially the same as) a center position in a transverse direction of the hub of the drive device of the fifteenth aspect.

According to the inventions of the thirteenth to sixteenth aspects, the recording tape can be favorably wound at the substantial center in a transverse direction of the hub. Accordingly, vertical fluctuation of the recording tape can be mitigated and sudden vertical fluctuation of the recording tape can be suppressed.

Further, in a recording tape cartridge according to a seventeenth aspect, the case accommodates the single reel such that the single reel is rotatable.

Further, in a recording tape cartridge according to an eighteenth aspect, the difference between the maximum radius and the minimum radius of the hub is from 0.08 mm to 0.20 mm.

Further, in a recording tape cartridge according to a nineteenth aspect, the difference between the maximum radius and the minimum radius of the hub is from 0.10 mm to 0.20 mm.

Further, in a drive device according to a twentieth aspect, the difference between the maximum radius and the minimum radius of the hub is from 0.08 mm to 0.20 mm.

Further, in a drive device according to a twenty-first aspect, the difference between the maximum radius and the minimum radius of the hub is from 0.10 mm to 0.20 mm.

As above, according to the present invention, a recording tape cartridge that achieves improvement of impact resistance by enabling a recording tape to be wound at the substantial center of a hub and that enables reduction of the occurrence of reading errors of servo signals and recording/playback errors of data signal when the tape is running inside a drive device, and the drive device, can be provided.

BRIEF DESCRIPTION OF THE DRAWINGS

Exemplary embodiments of the invention will be described in detail with reference to the following figures, wherein:

FIG. 9 is a schematic lateral view showing the vicinity of a recording tape cartridge tape guide;

FIG. 10A is a schematic lateral sectional view showing the structure of a tape guide and a spindle before loading into a drive device, and FIG. 10B is a schematic lateral sectional view showing the structure of a tape guide and a spindle after loading into a drive device.

DETAILED DESCRIPTION

Figure 1:
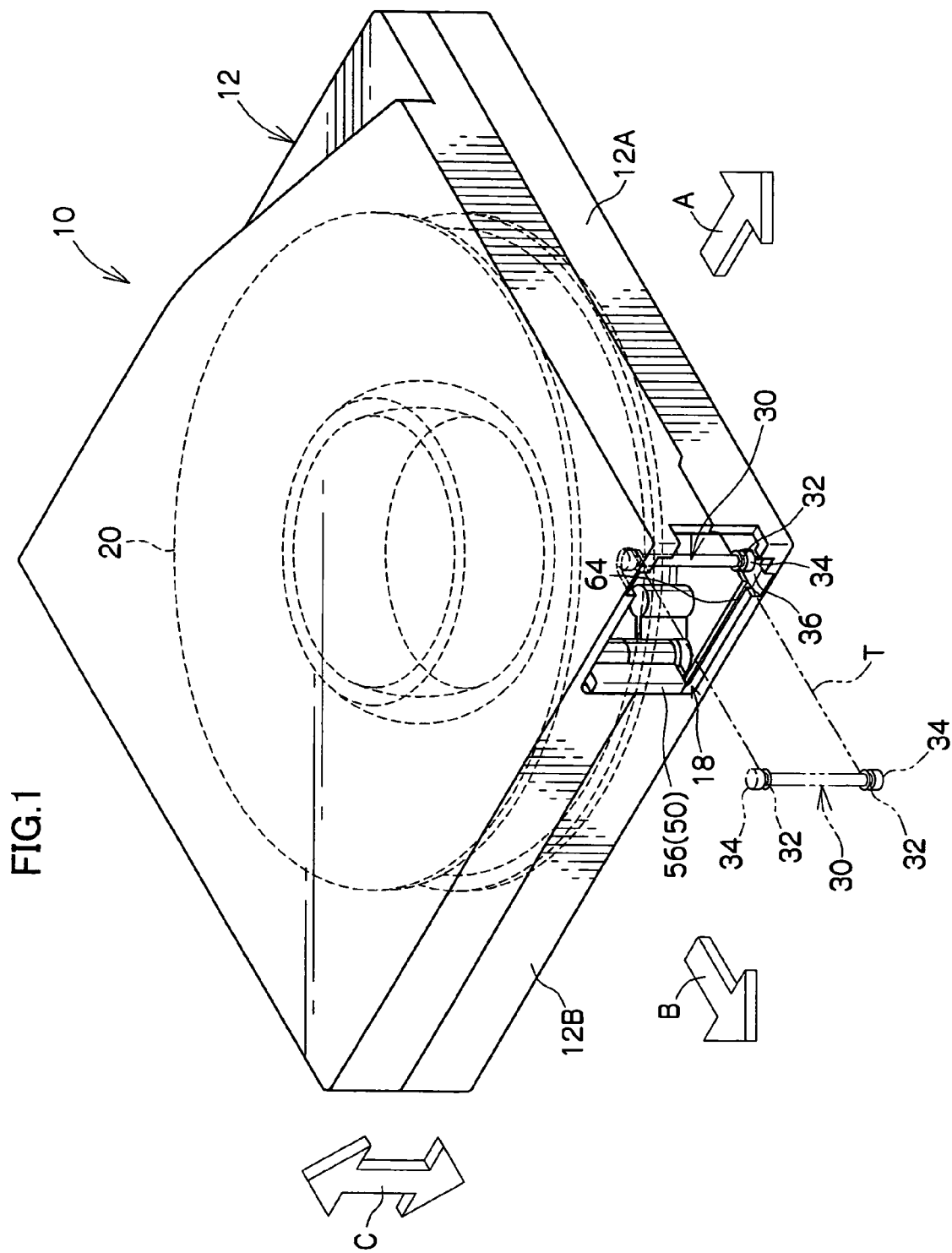
FIG. 1 is a schematic perspective view of a recording tape cartridge.

Preferred embodiments of the present invention will be described in detail on the basis of the embodiment illustrated in the drawings. Note that, for convenience of explanation, in FIG. 1, the direction of loading a recording tape cartridge 10 into a drive device 70 (see FIG. 7) is indicated by arrow A, and this is the front direction (the front side) of the recording tape cartridge 10. The direction of arrow B, which is orthogonal to arrow A, is the right direction (the right side). Further, the direction of arrow C is the transverse direction in the present invention, and there are cases in which the direction of arrow C will also be called the heightwise direction or the vertical direction.

Figure 2:
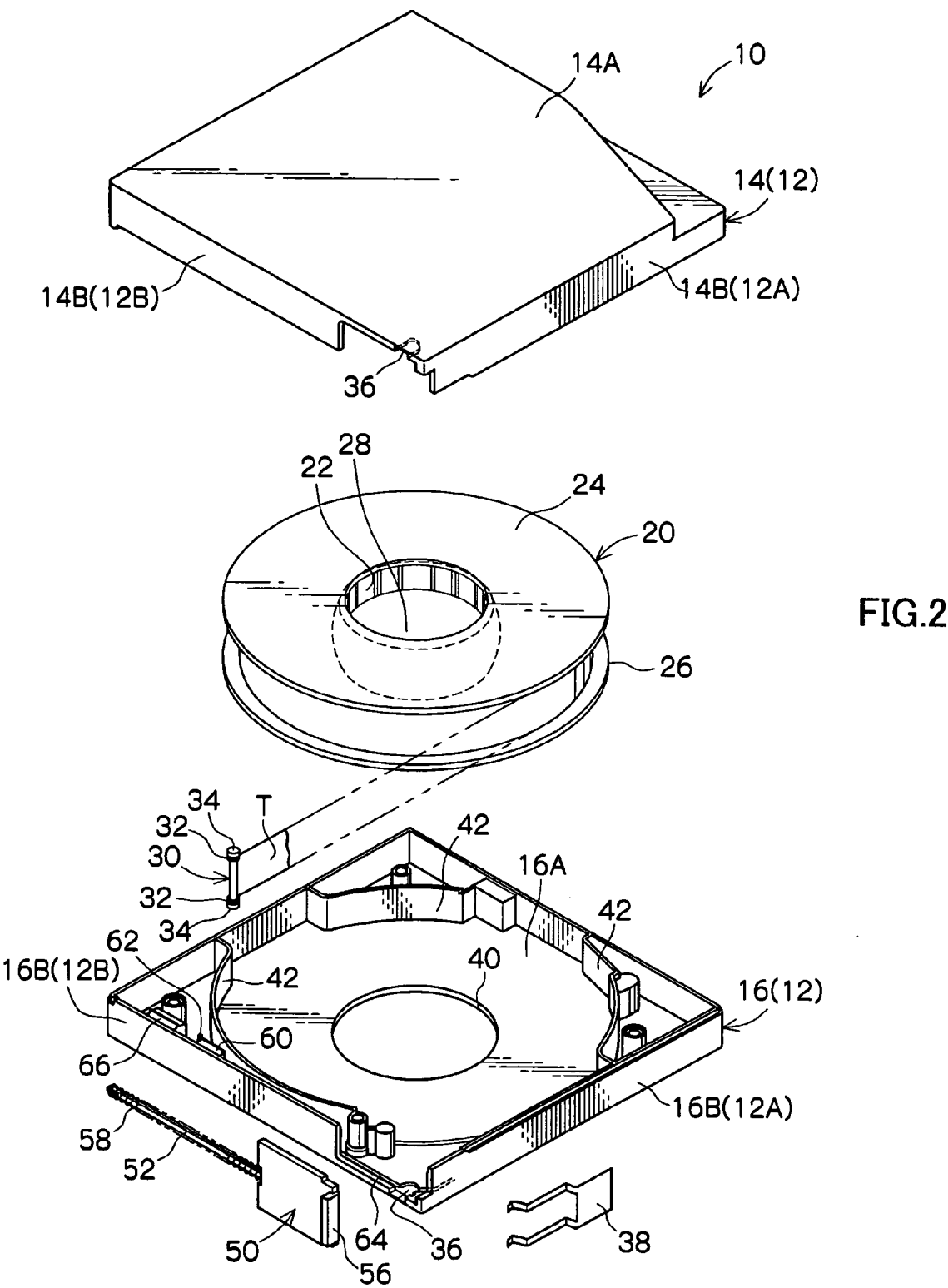
FIG. 2 is a schematic exploded perspective view of a recording tape cartridge viewed from above.

As shown in FIGS. 1 and 2, the recording tape cartridge 10 has a substantially rectangular box-shaped case 12. The case 12 is formed from an upper case 14 and a lower case 16 which are formed of a resin such as polycarbonate or the like. The case 12 is structured by a peripheral wall 14B, which stands erect at the peripheral edge of a ceiling plate 14A of the upper case 14, and a peripheral wall 16B, which stands erect at the peripheral edge of a floor plate 16A of the lower case 16, being joined together by ultrasonic welding or screws or the like, in a state of abutting one another.

A single reel 20 is rotatably accommodated within the case 12. The reel 20 is structured such that a reel hub 22, which is shaped as a cylindrical tube having a floor and which structures the axially central portion of the reel 20, an upper flange 24, which is provided at the upper end portion of the reel hub 22, and a lower flange 26, which is provided at the lower end portion of the reel hub 22, are included and the upper flange 24 and the lower flange 26 are ultrasonically welded to the upper end portion and the lower end portion of the reel hub 22. A recording tape T, such as a magnetic tape or the like which serves as an information recording/playback medium, is wound on the outer peripheral surface of the reel hub 22. The transverse direction end portions (edges) of the recording tape T wound thereon are held by the upper flange 24 and the lower flange 26.

Figure 4:
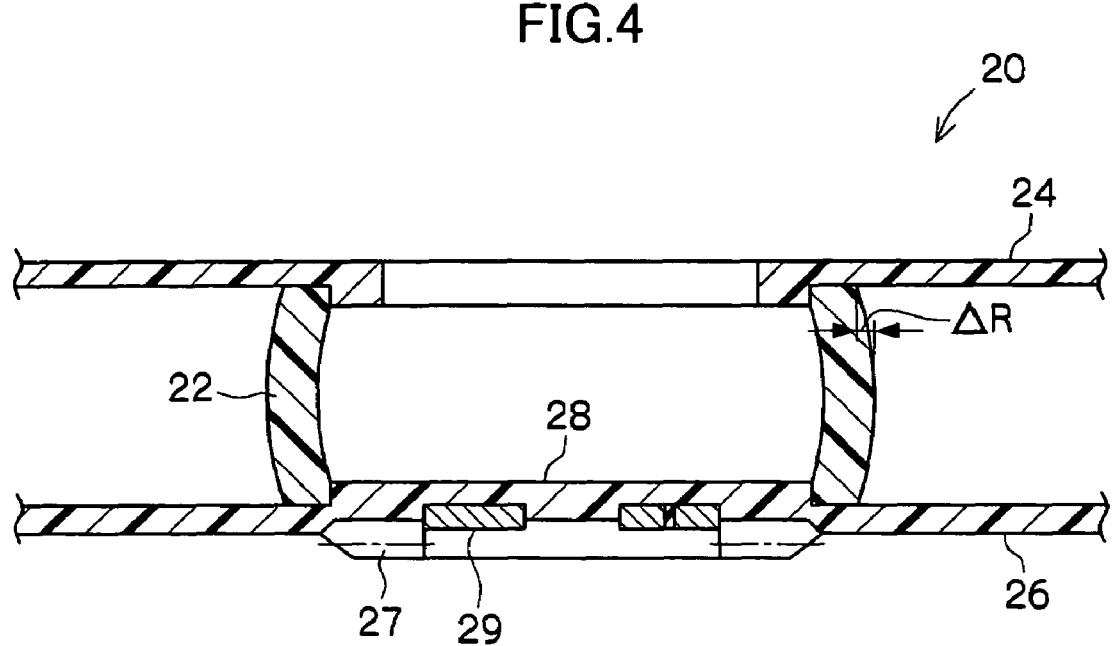
FIG. 4 is a schematic lateral sectional view of a reel.

Further, as shown in FIG. 4, the reel hub 22 is substantially barrel-shaped (in the following, referred to in some cases as a "crowning shape") such that, as viewed from the side, the substantially central portion in a width (a height) direction is distended in a circular arc shape. The difference ΔR between the maximum radius (the radius at the substantially central portion in the width direction) and the minimum radius (the radius at the upper and lower end portions in the width direction) of the reel hub 22 is in a range from 0.03 mm to 0.30 mm.

In other words, the difference ΔR is between 0.2% and 2.5% of the width measurement of the recording tape T that has a width of half an inch. When the difference ΔR is less than 0.03 mm, the effect of guiding the recording tape T to the center of the reel hub 22 is lessened, and when it is greater than 0.30 mm the problem occurs that the recording tape T wound on the reel hub 22 is deformed.

In addition, the difference ΔR is preferably in a range from 0.08 mm to 0.20 mm, and more preferably in a range from 0.10 mm to 0.20 mm. Further, the reel hub 22 having this kind of crowning shape can be manufactured by, for example, adding a grinding process.

Further, at the lower surface of a floor wall 28 of the reel hub 22, a reel gear 27 (refer to FIG. 4) is formed in a circular shape and a gear opening 40 is formed as a hole at a central portion of the lower case 16 such that the reel gear 27 is exposed to the outside. The reel gear 27 exposed via the gear opening 40 meshes with, and is driven by, a drive gear (not shown) at the drive device 70 (refer to FIG. 5) side and, as a result, the reel 20 is able to rotate within, and relative to, the case 12.

An annular reel plate 29 (see FIG. 4) formed of a magnetic material is fixed by insert molding or the like to the radial direction inner side of the reel gear, at the bottom surface of the floor wall 28. The reel plate is attracted to and held by the magnetic force of an annular magnet (not shown) of the drive device 70. Further, the reel 20 is held so as not to joggle by play restricting walls 42 which project out locally at the inner surfaces of the upper case 14 and the lower case 16. The play restricting walls 42 are inner walls which are on a circular locus to be coaxial with the gear opening 40.

An opening 18 for the pulling-out of the recording tape T wound on the reel 20, is formed in a right wall 12B of the case 12. A leader pin 30, which is pulled-out and operated while being anchored (engaged) by a pull-out member (not shown) of the drive device 70, is fixed to the free end portion of the recording tape T which is pulled-out from the opening 18.

Annular grooves 32 are formed in both end portions of the leader pin 30 which project-out further than the transverse direction end portions of the recording tape T. These annular grooves 32 are anchored by hooks or the like of the pull-out member. In this way, at the time when the recording tape T is pulled-out, the hooks or the like do not contact and scratch the recording tape T.

Further, a pair of upper and lower pin holding portions 36 are provided at the inner side of the opening 18 of the case 12, i.e., at the inner surface of the ceiling plate 14A of the upper case 14 and the inner surface of the floor plate 16A of the lower case 16. The pin holding portions 36 position and hold the leader pin 30 within the case 12. This pair of upper and lower pin holding portions 36 are formed in semicircular shapes whose recording tape T pull-out sides are open. Both end portions 34 of the leader pin 30, which is in an upright state, can enter into and exit from the pin holding portions 36 from these open sides.

A spring plate 38 is disposed and fixed in a vicinity of the pin holding portions 36. The distal end portions of a bifurcated portion of the spring plate 38 respectively engage with the upper and lower end portions 34 of the leader pin 30, such that the leader pin 30 is held in the pin holding portions 36. Note that, when the leader pin 30 is to enter into or exit from the pin holding portions 36, the distal end portions of the plate spring 38 are appropriately elastically deformed so as to permit movement of the leader pin 30.

Figure 3A:
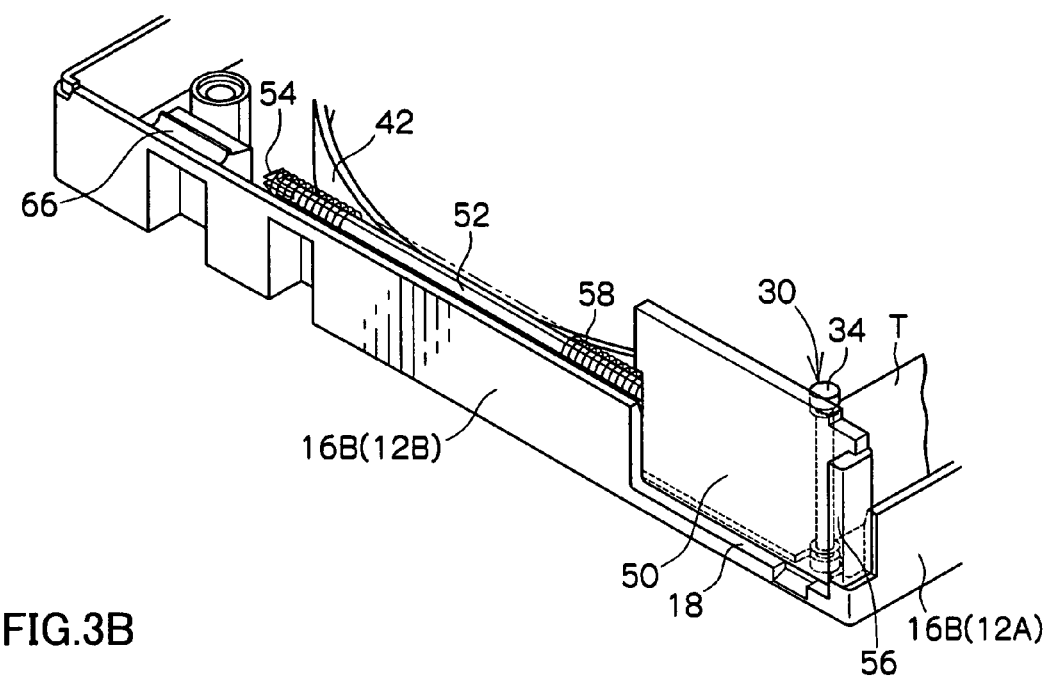
FIG. 3A is a schematic perspective view showing a door and an opening portion of a case.
Figure 3B:
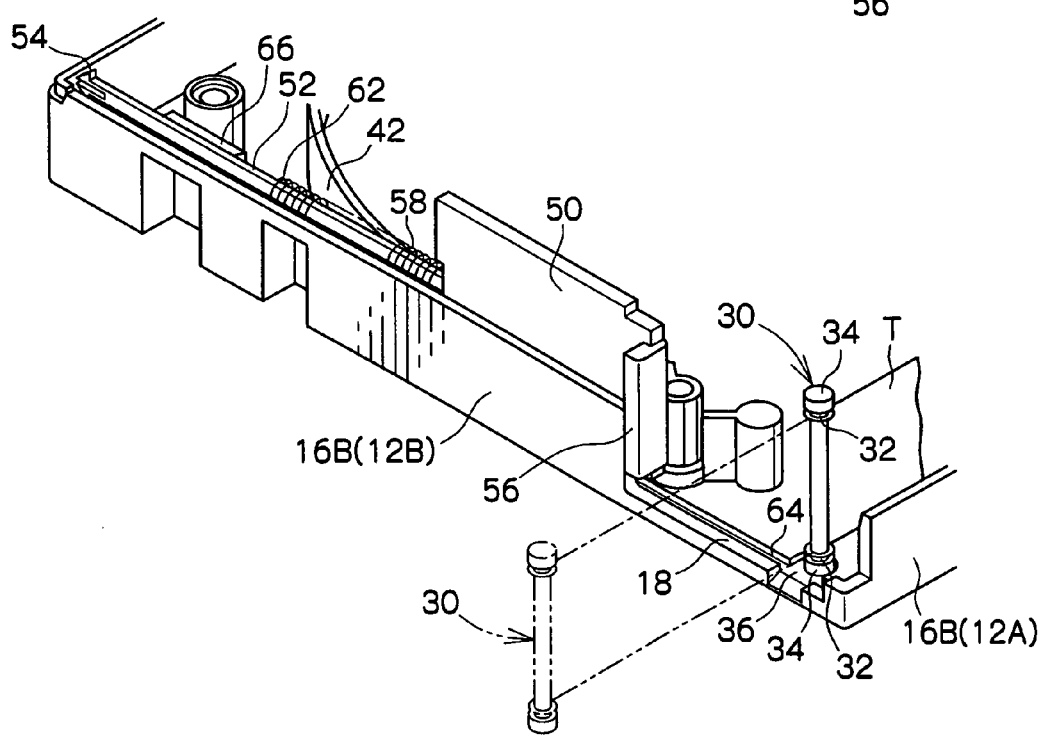
FIG. 3B is a schematic perspective view showing a door and an opening portion of a case.

The opening 18 is opened and closed by a door 50. As shown in detail in FIG. 3, the door 50 is structured as a substantially rectangular plate of a size which can close the opening 18. Groove portions 64, into which the upper and lower end portions of the door 50 are slidably fit, are formed in the ceiling plate 14A and the floor plate 16A at the inner side of the opening 18, such that the door 50 can move along the right wall 12B of the case 12.

A shaft 52 is formed to project at the center of the rear end portion of the door 50. A coil spring 58 is fit around the shaft 52. A widened portion 54, which prevents the coil spring 58 from falling off, is formed at the rear end of the shaft 52. A supporting stand 60, which has an anchor portion 62 which engages with the rear end of the coil spring 58, projects from the lower case 16.

The shaft 52 is supported so as to be freely slidable on the supporting stand 60, and the rear end of the coil spring 58 is anchored on the anchor portion 62. The door 50 is thereby always urged in the direction of closing the opening 18 by the urging force of the coil spring 58. It is preferable that a supporting stand 66, which supports the shaft 52 when the opening 18 is open, be formed so as to project out at the rear side of the supporting stand 60.

A convex portion 56 for opening/closing operation projects outwardly from the front end portion of the door 50. The convex portion 56 engages with an opening/closing member (not shown) of the drive device 70 as the recording tape cartridge 10 is loaded into the drive device 70. The door 50 is thereby opened against the urging force of the coil spring 58.

Figure 5:
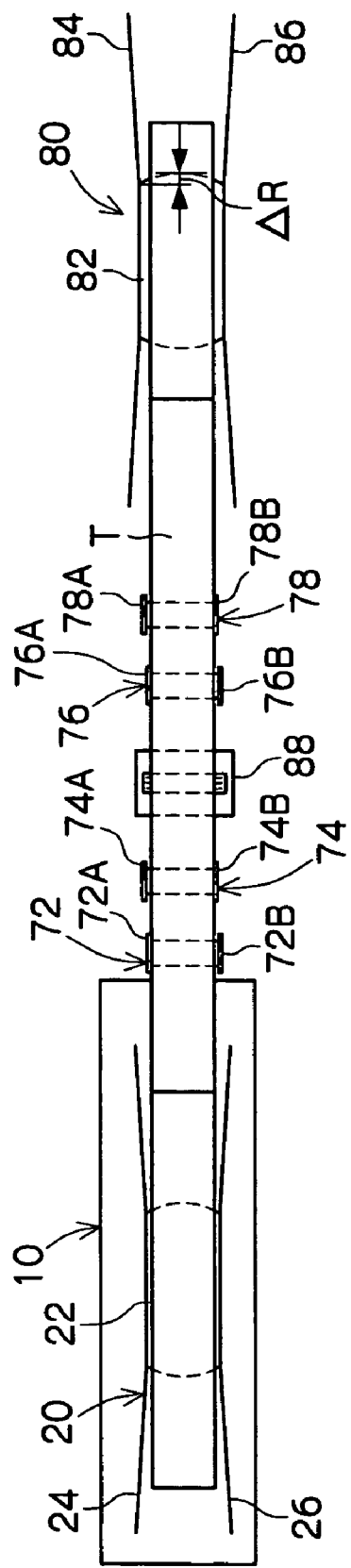
FIG. 5 is a schematic lateral view showing a state of a drive device after a recording tape cartridge has been loaded therein.
Figure 6:
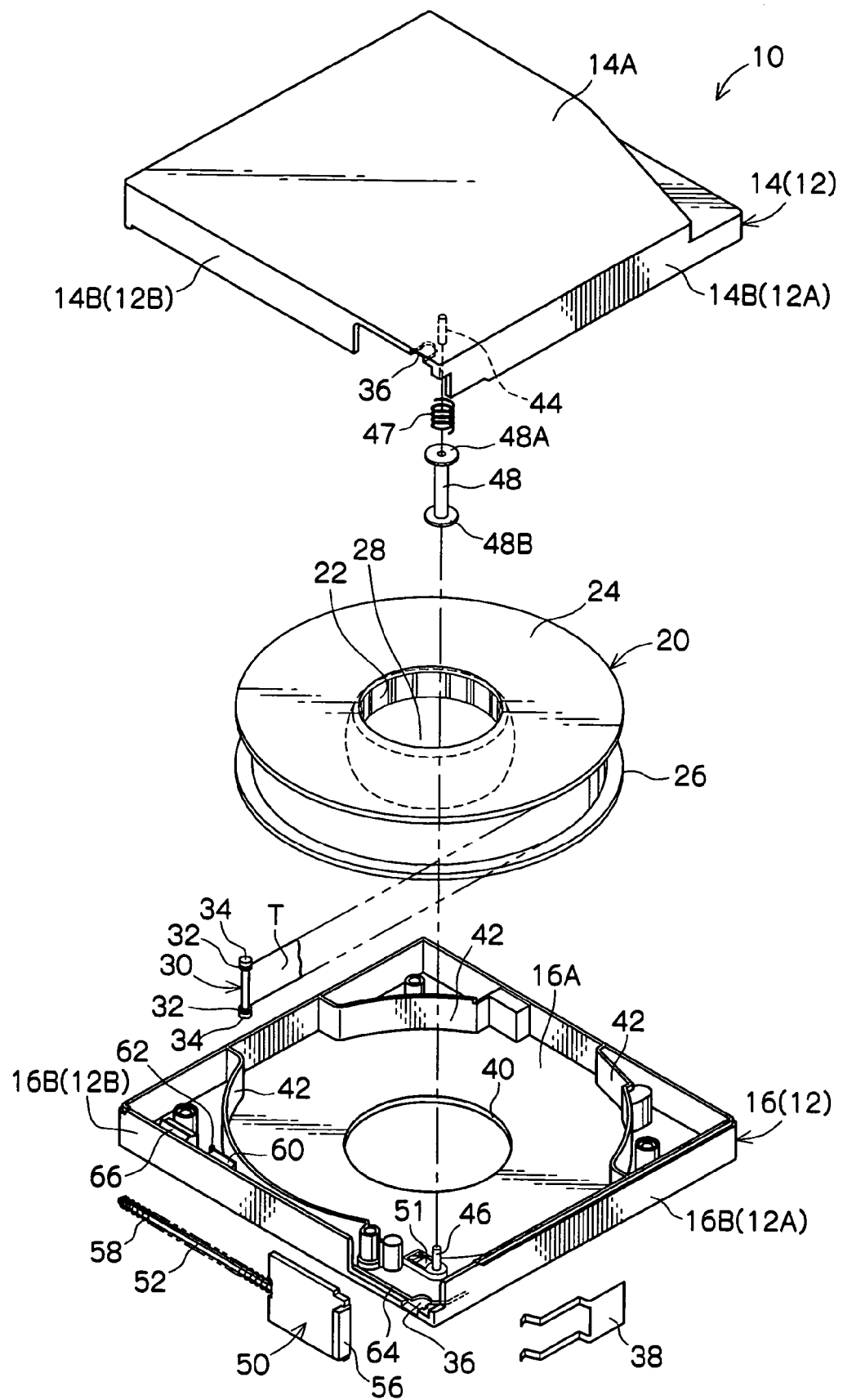
FIG. 6 is a schematic exploded perspective view of a recording tape cartridge provided with a tape guide as viewed from above.

Here, the drive device 70 into which the recording tape cartridge 10 is loaded is explained. The drive device 70, as shown in FIG. 5, has a take-up reel 80 onto which the recording tape T, which is pulled out from the recording tape cartridge 10 via the leader pin 30, is wound. A reel hub 82 of the take-up reel 80, similarly to the reel hub 22 of the reel 20, is substantially barrel-shaped (has a "crowning shape") such that, as viewed from the side, the substantially central portion in a width (a height) direction is distended in a circular arc shape.

In other words, since the take-up reel 80 is structured to accommodate the leader pin 30 at the reel hub 82, an upper flange 84 and a lower flange 86 are structured so as to be joined to the reel hub 82 by screws (or ultrasonic welding) and the difference RΔ between the maximum radius (the radius at the substantially central portion in a width direction) and the minimum radius (the radius at the upper and lower end portions in the width direction) of the reel hub 82 is in a range from 0.03 mm to 0.30 mm.

In other words, the difference ΔR is between 0.2% and 2.5% of the width measurement of the recording tape T that has a width of half an inch. When the difference ΔR is less than 0.03 mm, the effect of guiding the recording tape T to the center of the reel hub 82 is lessened, and when it is greater than 0.30 mm the problem occurs that the recording tape T wound on the reel hub 82 is deformed, similarly to the reel hub 22.

Further, the difference ΔR is preferably in a range from 0.08 mm to 0.20 mm, and more preferably in a range from 0.10 mm to 0.20 mm, similarly to above. Further, the reel hub 82 having this kind of crowning shape can be manufactured by, for example, adding a grinding process as above.

Next, the operation of the recording tape cartridge 10 and the drive device 70 having the above structure is explained. In the recording tape cartridge 10 structured as above, the opening 18 is closed by the door 50 when the recording tape cartridge 10 is not loaded into the drive device 70 and is not in use (for example, during storage or transportation). Then, when the recording tape T is used, the recording tape cartridge 10 is loaded into the drive device 70 in the direction of arrow A with the front wall 12A being loaded first.

The recording tape cartridge 10 is inserted into a bucket (not shown) of the drive device 70, and an opening/closing member (not shown) provided at the bucket (the drive device) engages with the convex portion 56 of the door 50. In this state, when the recording tape cartridge 10 moves further in the direction of arrow A, the convex portion 56, with which the opening/closing member is engaged, moves relatively rearward against the urging force of the coil spring 58. In this way, the door 50 slides rearward within the groove portions 64 and along the side wall 12B, and opens the opening 18.

The recording tape cartridge 10 moves to a predetermined loading position of the drive device 70 (the bucket), and the opening 18 is completely opened. Next, the bucket, which is accommodating the recording tape cartridge 10 is lowered a predetermined height, and positioning members (not shown) of the drive device 70 are inserted relatively into hole portions for positioning (not shown) which are formed in the lower case 16. In this way, the recording tape cartridge 10 is positioned accurately at a predetermined position within the drive device 70, and further sliding of the door 50 (further movement of the door 50 rearward) is regulated.

Due to the operation of the recording tape cartridge 10 (bucket) being lowered, the driving gear (not shown) relatively enters in from the gear opening 40, meshes together with the reel gear 27, and raises the reel 20 to a predetermined height (see FIG. 5). Then, in the state in which the driving gear and the reel gear 27 are completely meshed-together, the reel plate 29 is attracted and held by the magnetic force of the annular magnet (not shown) provided at the inner side of the driving gear. In this way, the reel 20 is set in an unlocked state in which it can rotate relative to the case 12 within the case 12, while the meshing-together of the reel gear 27 with the driving gear is maintained.

The pull-out member (not shown) which is provided at the drive device 70 enters into the case 12 from the opening 18 which has been opened, and grasps and pulls-out the leader pin 30 which is positioned and held at the pin holding portions 36. Since the recording tape cartridge 10 is accurately positioned within the drive device 70 at this time, the hooks of the pull-out member can reliably be made to anchor the annular grooves 32 of the leader pin 30. Further, because the rotation locked state of the reel 20 is released, the reel 20 rotates as the leader pin 30 is pulled out.

In this way, the leader pin 30 that has been pulled out from the opening 18 is accommodated at the reel hub 82 of the take-up reel 82 at the drive device 70 side; however, before this, the recording tape T that has been pulled out from the case 12 is slid against a tape guide 72 that is positioned closest to the recording tape cartridge 10. The tape guide 72 is mounted such that the height position thereof is offset toward the center or toward either a lower or upper position; for example, toward a lower position.

Accordingly, the recording tape T that is slid against the tape guide 72 travels in a state in which the upper edge thereof is regulated by a flange 72A provided at the upper side of the tape guide 72, and is next slid against a tape guide 74. The tape guide 74 is mounted such that the central position in a width direction (a height direction) thereof is offset at a higher position than the central position in a width direction (height direction) of the reel hub 22, and the lower edge of the recording tape T is regulated by a flange 74B provided at the lower side of the tape guide 74.

The recording tape T having its position regulated by the tape guide 74 is next slid against a tape guide 76. Further, before sliding against the tape guide 76, the recording tape T is slid (passed) against a recording/playback head 88. The tape guide 76 is mounted in a reverse manner to the tape guide 74 such that, similarly to the tape guide 72, the central position in a width direction (height direction) thereof is offset at a lower position than the central position in a width direction (height direction) of the reel hub 22 and the upper edge of the recording tape T is regulated by a flange 76A provided at the upper side of the tape guide 76.

The recording tape T having its position regulated by the tape guide 76 is then slid against a tape guide 78. Similarly to the tape guide 74, the tape guide 78 is mounted such that the central position in a width direction (a height direction) thereof is offset at a higher position than the central position in a width direction (height direction) of the reel hub 22, and the lower edge of the recording tape T is regulated by a flange 78B provided at the lower side of the tape guide 78.

By making the heightwise positions (transverse direction positions) of the respective drive device tape guides 72 through 78 within the drive device 70 differ alternately along the tape path of the recording tape T in this way, the regulating of the transverse direction (vertical direction) position of the recording tape T can be carried out favorably.

By rotating and driving the take-up reel 80 and the reel 20, synchronously, when the leader pin 30 is accommodated at the reel hub 82 of the take-up reel 80 while the recording tape T being regulated in the transverse direction (vertical direction ) by the drive device tape guides 72 through 78, the recording tape T is taken up onto the take-up reel 80 and pulled out from the case 12 sequentially. At this time, the recording or playback of information is carried out by the recording/playback head 88 which is disposed between the drive device tape guides 74 and 76.

Further, at this time, since the reel hub 82 of the take-up reel 80 has a crowning shape, the recording tape T is taken up such that the recording tape T is regulated at the substantially central portion in a transverse direction of the reel hub 82 (such that the central position in a transverse direction of the recording tape T and the central position in a transverse direction of the reel hub 82 are substantially aligned). Accordingly, at the take-up reel 80, a phenomenon whereby one wind of the recording tape T sticks out is prevented and, at the same time, and variation in a transverse direction (the upper lower direction) of the recording tape T while traveling are mitigated and sudden vertical variation of the recording tape T is suppressed.

The recording/playback head 88 is supported so as to be able to move in the vertical direction (the heightwise direction) by an actuator (not shown), and moves in the vertical direction (heightwise direction) following servo signals S provided on the recording tape T. As shown in FIG. 9 for example, four patterns P (or five or the like may be used) are provided in parallel to become a substantial truncated V-shape and form one group of the servo signals S. Plural of these groups are disposed in lines in vicinities of the upper and lower end portions of the recording tape T, such that the widening sides of the groups of servo signals S formed in substantial truncated V-shapes face outwardly.

It can be understood that, if the sensing time (distance) of one group of servo signals S (shown by W in FIG. 9) becomes long, the position of the recording tape T which is traveling is offset one of upward and downward with respect to the recording/playback head 88. Therefore, the vertical direction (heightwise direction) position of the recording/playback head 88 is adjusted in accordance therewith.

In particular, in recent recording tapes T that have a high recording density (high capacity), since the size (the length of the pattern P) of the servo signals S and the size of the recording signals themselves are decreased and the distance between patterns P and between recording signals is also decreased, stabilizing the traveling position of the recording tape T (suppressing sudden vertical variation) by giving the reel hub 82 a crowning shape is extremely effective. That is, by providing this structure, it is possible to reduce the occurrence of reading errors of the servo signals S (see FIG. 9) and of recording or reproduction errors of data signals in the drive device 70, even in the case of a recording tape T having improved recording density.

In this way, by sliding the recording tape against the recording/playback head 88 while regulating the height position thereof with the respective tape guides 72 through 78, the recording tape T, for which recording or playback of information has been completed without any errors, is rewound onto the reel 20 by reversing the rotation of the drive gear and the take-up reel 80.

Then, at this time also, by regulating the position of the recording tape T in a transverse direction (a vertical direction) and since the reel hub 22 has a crowning shape, the recording tape is always rewound onto the reel hub 22 while being regulated at the substantially central position in a transverse direction thereof (with the central position in a transverse direction of the recording tape T and the central position in a transverse direction of the reel hub 22 being substantially aligned). Accordingly, at the reel 20, the phenomenon whereby one wind of the recording tape T sticks out is prevented and it is possible to make it difficult for the recording tape T to be damaged when the recording tape cartridge 10 is transported or dropped and to ensure that even if the recording tape T is damaged, the damage is minimal.

When the recording tape T is rewound on the reel 20 to the end and the leader pin 30 is held at the pin holding portions 36, the bucket accommodating the recording tape cartridge 10 rises a predetermined height, the positioning members (not shown) are pulled-out from the hole portions for positioning (not shown), the driving gear is pulled-out from the gear opening 40, and the meshing of the driving gear with the reel gear 27 is cancelled. Then, the reel 20 is lowered to its original heightwise position.

Thereafter, the recording tape cartridge 10 is moved in the direction opposite to the direction of arrow A by an ejecting mechanism (not shown). Accompanying this movement, the door 50 slides in the direction of closing the opening 18 due to the urging force of the coil spring 58, and completely closes the opening 18 (returns to the initial state). The recording tape cartridge 10, whose opening 18 is closed in this way, is completely ejected from the drive device 70 (the bucket).

Next, a case when a tape guide 48 is provided inside the recording tape cartridge 10 is explained. When the tape guide 48 is provided, it is possible to wind the recording tape T at a substantially central position in a transverse direction with respect to the reel hubs 22 and 82 with greater precision. The tape guide 48 will be explained.

As shown in FIGS. 6 through 9, pivots 44 and 46 are respectively provided at the upper case 14 and the lower case 16 so as to extend from a predetermined position in the vicinity of the opening 18, and when the case 12 is assembled, a substantially cylinder-shaped tape guide 48 is fitted to the pivots 44 and 46 so as to be capable of movement. That is, the inner diameter of the tape guide 48 is formed to be slightly larger than the outer diameter of the pivots 44 and 46 and the tape guide 48 is freely rotatable in a state in which it is supported by the pivots 44 and 46.

Flanges 48A, 48B are formed integrally at the both upper and lower ends of the tape guide 48, so that the positions of the edges, which are the transverse direction end portions (upper and lower ends) of the recording tape T, can be regulated. The outer diameter of the portion of the tape guide 48, where the recording tape T slidingly contacts, (i.e., the portion other than the flanges 48A, 48B) is preferably about 6 mm to 10 mm.

The tape guide 48 is structured such that, when the recording tape cartridge 10 is loaded into the drive device 70, accompanying (interlockingly with) the upward movement of the reel 20, the tape guide 48 can move upwardly so as to become the same height as the reel 20. A coil spring 47 is fit on the pivot 44. One end of the coil spring 47 is supported at the ceiling plate 14A, whereas the other end is supported at the top surface of the flange 48A of the tape guide 48. In this way, the tape guide 48 is always urged toward the floor plate 16A.

The pivot 46 projects at the center of the top surface of a cylindrical base 45 which projects at the floor plate 16A. The bottom surface of the flange 48B abuts the base 45 due to the urging force of the coil spring 47. The outer diameter of the flange 48B is formed to a size which juts outwardly by a predetermined length (a length which an engaging pin 71 which will be described later can abut) more than the base 45 as seen in plan view.

A substantially rectangular hole 17 is formed in the floor plate 16A in a vicinity of the base 45 (adjacent to the base 45). The front and rear direction opposite sides of the hole 17 are parallel arcs, and the left and right direction opposite sides are parallel straight lines. The hole 17 overlaps the flange 48B as seen in plan view (see FIGS. 7 and 10A and 10B).

When the recording tape cartridge 10 is loaded into the drive device 70, due to the engaging pin 71, which is provided at the drive device 70, entering in from the hole 17, the tape guide 48 moves via the flange 48B toward the ceiling plate 14A against the urging force of the coil spring 47.

As shown in FIGS. 10A and 10B, the hole 17 can be closed by a cover 51. The cover 51 is provided within a substantially rectangular frame-shaped frame 55, which is integral with the base 45 and is provided at the floor plate 16A so as to project to the same height as the base 45. The cover 51 is held so as to be slidable in the front-back directions (the direction of arrow D and the direction of arrow E), and is always urged in the direction of closing the hole 17 by an urging member such as a torsion spring 57 or the like.

One end of the torsion spring 57 abuts a rear end 51B of the cover 51 which is positioned at the side opposite the hole 17. The other end of the torsion spring 57 abuts a rear wall 55A within the frame 55 which is positioned at the side opposite the hole 17. A leading end 51A, at the hole 17 side, of the cover 51 is cut-out in a substantially arc-shaped form as seen in plan view, so as to match the configuration of the base 45.

Due to the urging force of the torsion spring 57, the cover 51 slides in the direction of arrow D which is toward the hole 17, and abuts the peripheral surface (side surface) of the base 45, and closes the hole 17. In this way, when the recording tape cartridge 10 is in a state of non-use in which it is not loaded into the drive device 70 (e.g., at the time when the recording tape cartridge 10 is being stored, or is being transported, or the like), entry of dust and the like from the hole 17 is prevented.

The bottom surface of the leading end 51A of the cover 51 is an inclined surface 51C of a predetermined angle (e.g., 45°). Accordingly, the distal end of the engaging pin 71 is formed to be an inclined surface 71A of a predetermined angle (e.g., 45°) which can slide along the inclined surface 51C. Namely, when the engaging pin 71 enters-in from the hole 17 and the inclined surface 71A abuts the inclined surface 51C and pushes it upward, the cover 51 slides in the direction of arrow E and opens the hole 17.

Further, as shown in FIG. 9, the width (height) H1 of the portion of the tape guide 48 against which the recording tape T slidingly contacts (the portion of the tape guide 48 except for the flanges 48A, 48B) is smaller than the width (height) H2 of the reel hub 22. Moreover, the tape guide 48 is mounted such that the central position thereof in a transverse direction (height direction) is substantially aligned with the central position in a transverse direction (height direction) of the reel hub 22.

Further, the tape guide 48 is disposed with a high degree of precision such that the recording tape T can slidably contact it, between the reel 20 (the upper flange 24 and the lower flange 26) and the leader pin 30 and at least while the leader pin 30 (the recording tape T) is pulled out from inside the case 12 (and preferably also when the leader pin 30 is held by the holding portions 36).

Figure 7:
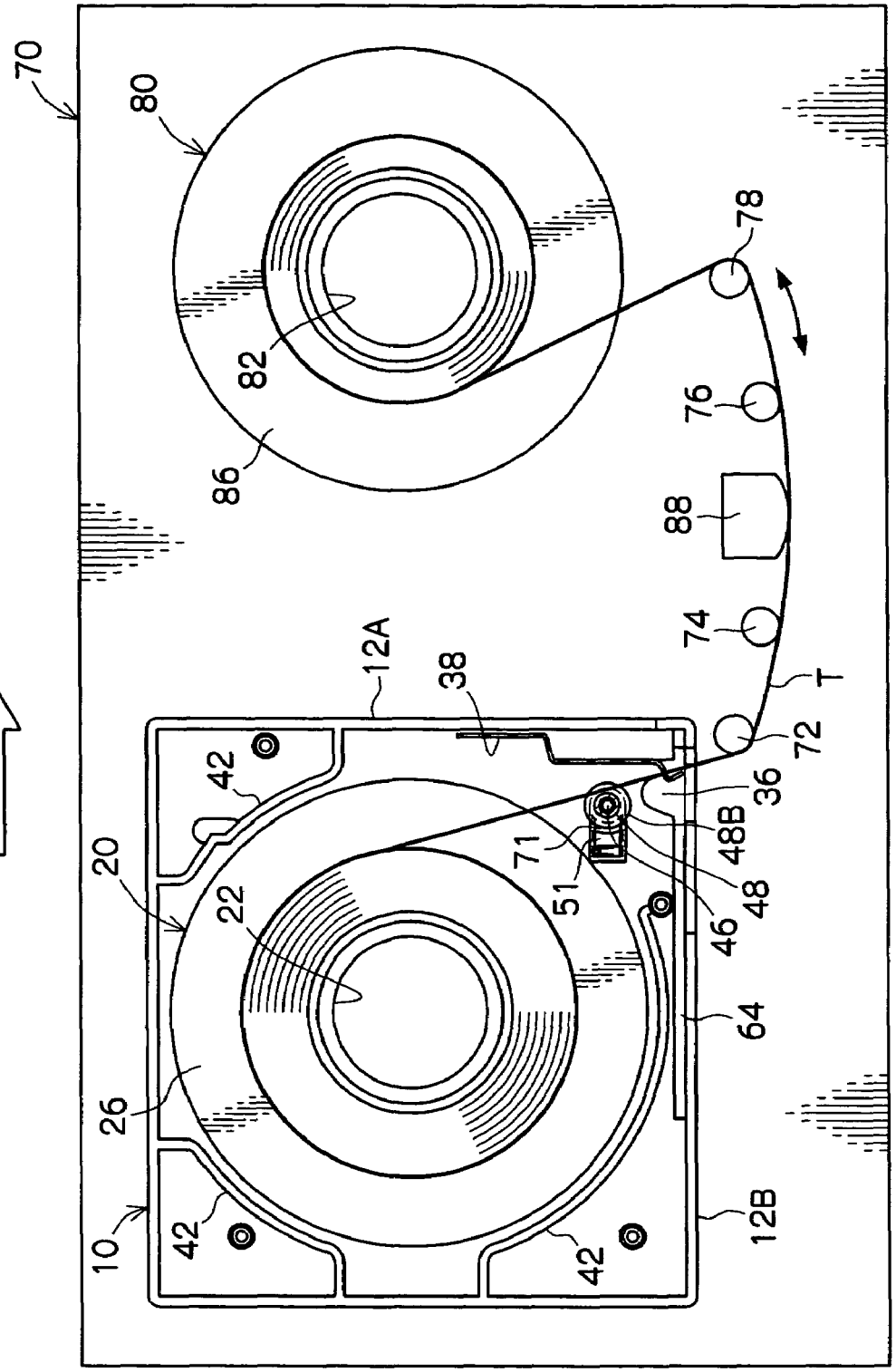
FIG. 7 is a schematic plan view showing the state of a drive device having a recording tape cartridge loaded therein.
Figure 8:
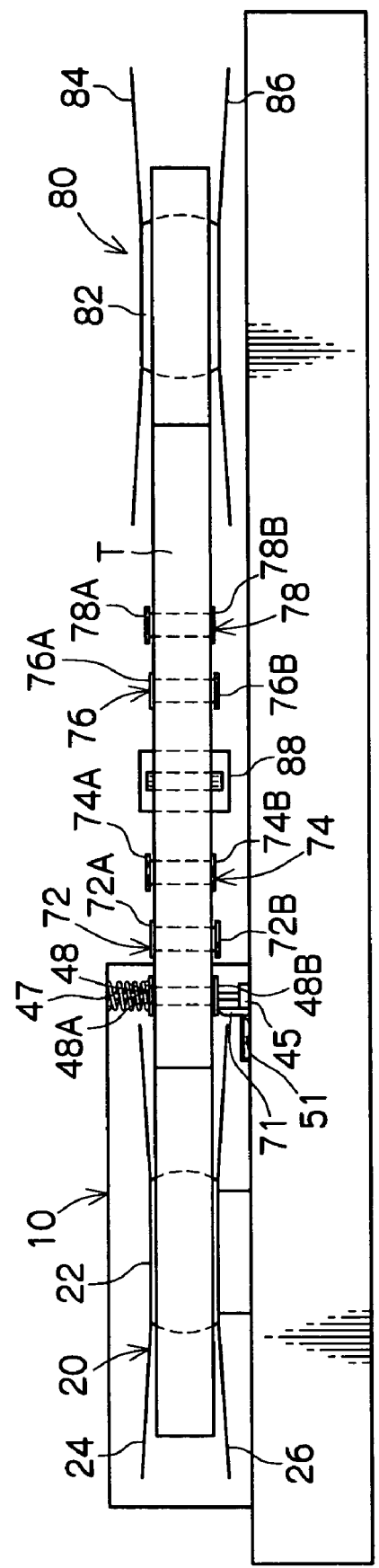
FIG. 8 is a schematic lateral view showing a state of a drive device after a recording tape cartridge has been loaded therein.

Accordingly, the structure is such that the recording tape T is regulated by the tape guide 48 such that the central position in a transverse direction (vertical direction) is substantially aligned with the central position in a transverse direction (height direction) of the reel hub 22 (see FIGS. 7 to 9). Further, the material of the tape guide 48 may either be a resin or a metal.

Note that, in FIG. 7, the upper flanges 24 and 84 (see FIG. 8) are omitted, and the reel 20 and the take-up reel 80 are shown by the reel hubs 22, 82, the lower flanges 26, 86, and the recording tape T. Further, because the tape path of the recording tape T passes between the forked distal end portions of the plate spring 38, the tape path does not interfere with the plate spring 38.

Next, the operation of the tape guide 48 having this kind of structure is explained. When the recording tape cartridge 10 is loaded into the drive device 70 and the bucket is lowered, the engaging pin 71 that is provided projectingly at the drive device 70 side relatively enters into the hole 17 and the inclined surface 71A of the distal end of the engaging pin 71 presses the inclined surface (lower surface) 51C of the leading end 51A of the cover 51 upwardly. As a result, the cover 51 slides in the direction of arrow E against the urging force of the torsion screw 57 and the hole 17 is opened together with the intrusion of the engaging pin 71 (see FIGS. 10A and 10B).

Because the hole 17 overlaps with the flange 48B as seen in plan view, the engaging pin 71, which enters in from the hole 17, abuts the bottom surface of the flange 48B, and pushes the tape guide 48 upward via the flange 48B against the urging force of the coil spring 47. The reel 20 and the tape guide 48 are thereby held at the same heightwise position. The reel 20 and the tape guide 48 are always held at the same heightwise position (see FIG. 8).

In this way, because the heightwise positions of the reel 20 and the tape guide 48 are not offset, twisting of the recording tape T, which is caused by offset in the heightwise positions of the reel 20 and the tape guide 48, does not arise. Namely, the recording tape T is not damaged. Further, the position adjusting structure, which is formed from the urging means (the coil spring 47) which urges the tape guide 48 toward the floor plate 16A and the like, is provided at the recording tape cartridge 10. Therefore, the heightwise positions of the reel 20 and the tape guide 48 can be made to be the same merely by providing the engaging pin 71 projectingly at the drive device 70. This is preferable because there is no need to provide a complex mechanism such as an actuator or the like for raising the tape guide 48, and the manufacturing cost can be lowered.

In the state in which the leader pin 30 is held in the pin holding portions 36, the tape guide 48 is disposed at a position at which the recording tape T slidingly contacts the tape guide 48. Further, as shown in detail in FIG. 9, in side view, it is mounted such that the central position in the transverse direction (heightwise direction) of the tape guide 48 substantially coincides with the central position in the transverse direction (heightwise direction) of the reel hub 22, and the width H1 of the tape guide 48 is smaller than the width H2 of the reel hub 22.

Accordingly, transverse direction (vertical direction) fluctuations of the recording tape T during traveling can be mitigated, and sudden vertical fluctuations of the recording tape can be suppressed. The traveling position of the recording tape T is stable, and even with a recording tape T having an improved recording density, the occurrence of reading errors of servo signals S (see FIG. 9) and recording/playback errors of the data signals at the drive device 70 can be reduced.

Further, the position in a transverse direction (vertical direction) is also regulated by the tape guide 48 when the recording tape T is rewound into the reel hub 22, and due to the crowning shape of the reel hub 22, it is always wound on while being regulated at the substantial center in a transverse direction of the reel hub 22. Accordingly, at the reel 20, the phenomenon whereby one wind of the recording tape T flies out is prevented, and even when the recording tape cartridge 10 during transportation or when dropped, for example, the recording tape T can be prevented from being damaged, and even when it is damaged, the damage is minimized.

When the recording tape T is rewound onto the reel hub 22 and the leader pin 30 is held by the holding portions 36, the engaging pin 71 is withdrawn from the hole 17 together with the raising operation of the bucket accommodating the recording tape cartridge 10. As a result, the tape guide 48 is lowered by the urging force of the coil spring 47 in conjunction with (simultaneously with) the lowering operation of the reel 20, and is held at its original height position by the lower surface of the flange 48B contacting the base 45.

When the engaging pin 71 is pulled out from the hole 17, the cover 51 slides in the direction of arrow D due to the urging force of the torsion spring 57, and the leading end 51 A of the cover 51 abuts the peripheral surface of the base 45. The hole 17 is thereby closed.

In this way, at times other than when the engaging pin 71 is inserted in the hole 17 (i.e., at times other than when the recording tape cartridge 10 is loaded in the drive device 70), the hole 17 is always closed by the cover 51. Therefore, when the recording tape cartridge 10 is not in use (is being stored or is being transported or the like), there is no fear that dust or the like will enter into the recording tape cartridge 10 (the case 12) from the hole 17.

Figure 11:
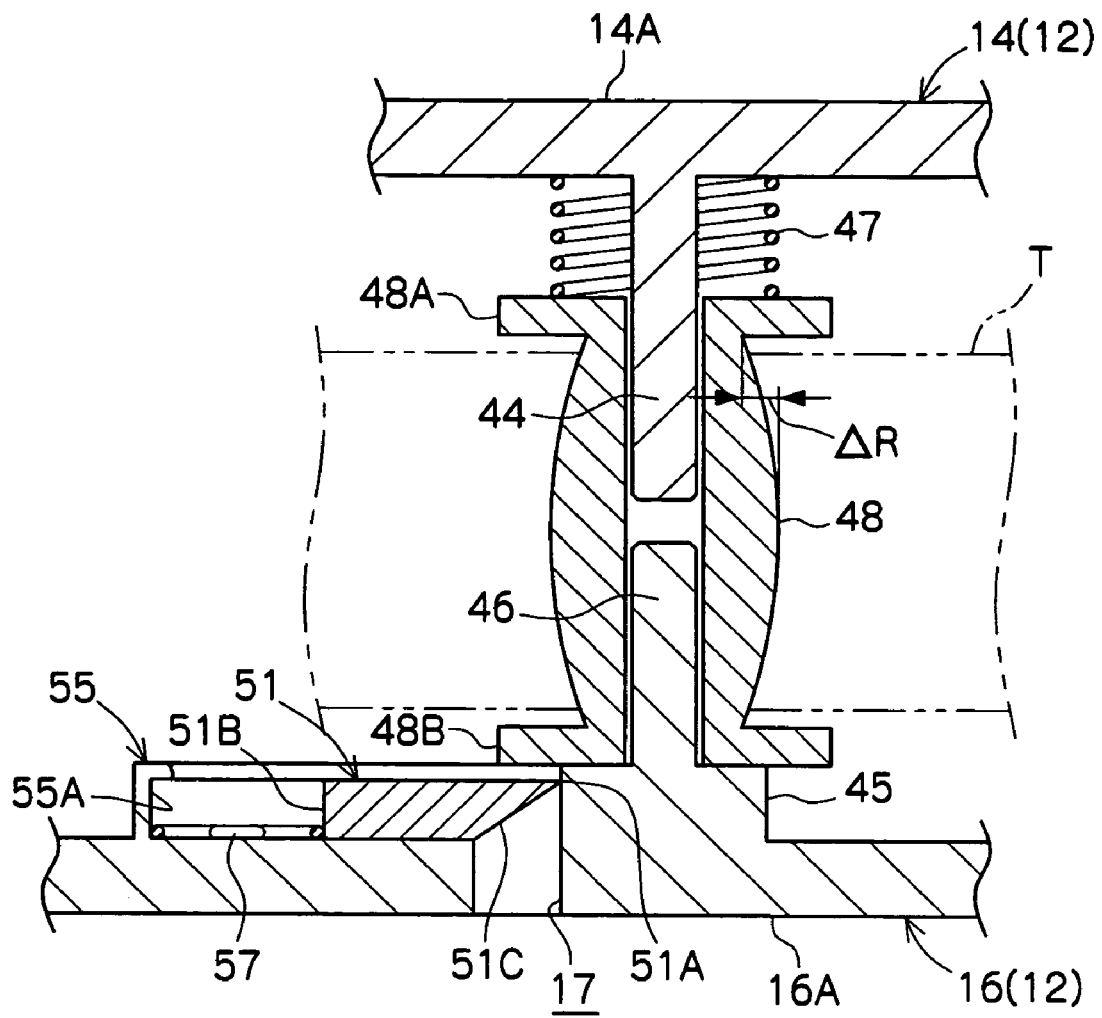
FIG. 11 is a schematic lateral sectional view showing the structure of a tape guide and a spindle given a crowning shape.

As shown in FIG. 11, the tape guide 48 is formed in a substantial barrel shape (crowning shape) such that the central portion thereof as seen in side view swells-out arcuately similar to the reel hubs 22 and 82. In the case of this configuration, metal is easier to mold. Further, it is preferable that a difference ΔR of the maximum radius and the minimum radius of the tape guide 48 is ΔR=70 μm to 500 μm, and more preferably, ΔR=100 μm to 200 μm.

When the tape guide 48 is formed in such a substantial barrel shape (crowning shape), the position of the recording tape T which is traveling can always be appropriately regulated to the transverse direction (heightwise direction) center of the tape guide 48. Therefore, sudden vertical fluctuations of the recording tape T can be suppressed even more. The drive device tape guides 72 through 78 may, of course, be formed in such substantial barrel shapes (crowning shapes).

As explained above, since the reel hubs 22, 82 of the reel 20 and the take-up reel 80 are formed in a substantial barrel shape (crowning shape), it is always possible to wind the recording tape T at the substantial center in a transverse direction (height direction) of the reel hubs 22, 82. Accordingly, the phenomenon whereby one wind of the recording tape T flies out can be prevented, and even if the recording tape cartridge 10 receives an impact during transportation or when dropped, for example, damage to the recording tape T can be reduced (impact resistance can be improved). Accordingly, when the recording tape T is traveling inside the drive device 70, occurrence of reading errors of servo signals S and recording/playback errors of data signals can be reduced.

Further, since it is enough to form the reel hubs 22, 82 of the reel 20 and the take-up reel 80 in a substantial barrel shape (crowning shape), there is the advantage that more compact and low cost production can be achieved than in a case where a structure allowing the recording tape T to be wound at the substantial center in a transverse direction of the reel hubs 22, 82 of the reel 20 and the take-up reel 80 is achieved by providing other parts separately.

Further, by providing a tape guide 48, against which the recording tape T slidably contacts at least while the leader pin 30 is being pulled out from the opening 18, inside the case 12 such that it is always able to be held at the same heightwise position as the reel 20, since the transverse direction (vertical direction) position of the recording tape T is favorably regulated by the tape guide 48, vertical fluctuation of the recording tape T can mitigated and sudden vertical fluctuation of the recording tape T can be suppressed. Accordingly, occurrence of reading errors of servo signals S and recording/playback errors of data signals at the recording/playback head 88 of the drive device 70 can be further reduced even with a recording tape T having improved recording density.

Further, by providing this kind of tape guide 48, even when the amount of the recording tape T wound on the reel hub 22 is reduced in a small capacity-type recording tape cartridge 10, the tape pass route when pulled out from the case 12 is always fixed (the route always slidably contacts the tape guide 48).

Accordingly, there is no need to prepare a separate large hub reel (not shown) wherein the diameter of the reel hub 22 is increased for use as a small capacity-type. In other words, regardless of the size of the diameter of the reel hub 22 and, further, regardless of the amount of the recording tape T wound on the reel hub 22, the tape pass route of the recording tape T can always be fixed and, accordingly, the versatility of the recording tape cartridge can be increased.

What is claimed is:

1. A recording tape cartridge, comprising:
   a reel having a recording tape wound at a hub;
   a case accommodating the reel such that the reel is rotatable; and
   an opening formed at the case from which a leader member attached to a distal end of the recording tape is pulled out, wherein
   the hub is formed in a substantial barrel shape, and
   the recording tape is wound such that the recording tape is regulated at a substantially central portion of the hub in a transverse direction of the hub; and
   wherein the difference between the maximum radius and the minimum radius of the hub is from 0.03 mm to 0.30 mm.

2. The recording tape cartridge of claim 1, wherein the difference between the maximum radius and the minimum radius of the hub is from 0.2% to 2.5% with respect to a transverse dimension of the recording tape.

3. The recording tape cartridge of claim 1, wherein the maximum radius of the hub is at the substantially central portion of the hub in the transverse direction of the hub, and the minimum radius of the hub is at an end portion of the hub in the transverse direction of the hub.

4. The recording tape cartridge of claim 3, wherein, when the recording tape cartridge is loaded into a drive device, a center position in a transverse direction of the recording tape when traveling is substantially aligned with a center position in a transverse direction of the hub.

5. The recording tape cartridge of claim 4, further comprising a tape guide provided inside the case such that the recording tape slidably contacts the tape guide at least while the leader member is being pulled out from the opening.

6. The recording tape cartridge of claim 5, wherein the tape guide has a substantially cylindrical shape with flanges formed at distal ends in a transverse direction and is structured so as to be rotatable in conjunction with the recording tape slidably contacting the tape guide.

7. The recording tape cartridge of claim 5, further comprising a position adjustment unit that enables the tape guide to move in conjunction with the reel to the same height when the recording tape cartridge is loaded into the drive device.

8. The recording tape cartridge of claim 7, wherein the position adjustment unit comprises:
   an urging unit that urges the tape guide toward a floor plate of the case; and
   a hole that in plan view overlaps the flange which is formed at a transverse direction end of the tape guide, and is provided at the floor plate of the case,
   the position adjustment unit being configured such that when the recording tape cartridge is loaded into the drive device, an engaging member provided at the drive device enters in from the hole and causes the tape guide to move toward a ceiling plate of the case against the urging force of the urging unit via the flange.

9. The recording tape cartridge of claim 8, further comprising a cover that can close the hole when the recording tape cartridge is not loaded into the drive device.

10. The recording tape cartridge of claim 5, wherein the tape guide is formed in a substantial barrel shape.

11. The recording tape cartridge of claim 1, wherein the case accommodates the single reel such that the single reel is rotatable.

12. The recording tape cartridge of claim 1, wherein the difference between the maximum radius and the minimum radius of the hub is from 0.08 mm to 0.20 mm.

13. The recording tape cartridge of claim 1, wherein the difference between the maximum radius and the minimum radius of the hub is from 0.10 mm to 0.20 mm.

14. : A drive device, comprising a take-up reel that winds up a recording tape pulled out from a recording tape cartridge loaded into the drive device, wherein
a hub of the take-up reel is formed in a substantial barrel shape, and
the recording tape is wound such that the recording tape is regulated at a substantally central portion of the hub in a transverse direction of the hub; and
wherein the difference between the maximum radius and the minimum radius of the hub is from 0.03 mm to 0.30 mm.

15. The drive device of claim 14, wherein the difference between the maximum radius and the minimum radius of the hub is from 0.2% to 2.5% with respect to a transverse dimension of the recording tape.

16. The drive device of claim 14, wherein the maximum radius of the hub is at the substantially central portion of the hub in the transverse direction of the hub, and the minimum radius of the hub is at an end portion of the hub in the transverse direction of the hub.

17. The drive device of claim 16, a center position in a transverse direction of the recording tape is substantially aligned with a center position in a transverse direction of the hub.

18. The drive device of claim 14, wherein the difference between the maximum radius and the minimum radius of the hub is from 0.08 mm to 0.20 mm.

19. The drive device of claim 14, wherein the difference between the maximum radius and the minimum radius of the hub is from 0.10 mm to 0.20 mm.

* * * * *